(12) United States Patent
Ojala

(10) Patent No.: US 7,047,000 B1
(45) Date of Patent: May 16, 2006

(54) FRAME ERROR IDENTIFICATION

(75) Inventor: Pasi Ojala, Lempäälä (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/111,166

(22) PCT Filed: Nov. 26, 1999

(86) PCT No.: PCT/IB99/02016

§ 371 (c)(1),
(2), (4) Date: Jul. 24, 2002

(87) PCT Pub. No.: WO01/39424

PCT Pub. Date: May 31, 2001

(51) Int. Cl.
*H04Q 7/20* (2006.01)

(52) U.S. Cl. ............... 455/422.1; 455/39; 455/517; 370/331; 370/350; 370/328

(58) Field of Classification Search ........... 455/422, 455/39, 500, 507, 517, 524, 436, 502, 542, 455/422.1; 370/331, 350, 328
See application file for complete search history.

(56) References Cited

U.S. PATENT DOCUMENTS

| | | | |
|---|---|---|---|
| 4,803,685 A | 2/1989 | Oget | 371/33 |
| 5,619,532 A | 4/1997 | Tani et al. | 375/224 |
| 5,943,328 A * | 8/1999 | Hosford | 370/331 |
| 6,243,372 B1 * | 6/2001 | Petch et al. | 370/350 |
| 6,747,961 B1 * | 6/2004 | Ahmed et al. | 370/328 |
| 2001/0012279 A1 * | 8/2001 | Haumont et al. | 370/331 |
| 2003/0008656 A1 * | 1/2003 | Yamashita et al. | 455/450 |

FOREIGN PATENT DOCUMENTS

| | | |
|---|---|---|
| EP | 0 768 806 | 4/1997 |
| WO | 00/35137 | 6/2000 |

* cited by examiner

*Primary Examiner*—Lester G. Kincaid
*Assistant Examiner*—Phuoc Doan
(74) *Attorney, Agent, or Firm*—G. Peter Albert, Jr.; Foley & Lardner, LLP

(57) ABSTRACT

A first mobile station generates an uplink error check code for a data frame for uplink transmission, and transmits the data frame and its associated uplink error check code to a cellular network. The network determines the quality of the received data frame and generates a downlink error check code for the received data frame. The received frame quality is determined as good or bad on the basis of a function of the received data or a parameter indicative of the quality of the received frame quality and the received data respectively. The data frame and the associated downlink error check code is transmitted to the second mobile station. The second mobile station decodes the received data frame and the associated downlink error check code and determines if the received data frame and the associated downlink error check code represents a good quality frame.

4 Claims, 5 Drawing Sheets

FRAME ERROR IDENTIFICATION

The present invention relates generally to identifying errors in frames transmitted over the air. The present invention has particular, but not exclusive, application to situations where data is transmitted from one mobile station to another mobile station via a network.

With the increasing popularity of mobile telephones, it is expected that in the future most telephone calls will be made from one mobile telephone to another mobile telephone.

In (second generation) GSM, the data from a telephone call is converted in the radio access network into pulse code modulation (PCM) format which serves as a kind of lingua franca in order that the call data can be easily routed to other systems such as the public telephone switching network (PTSN). This conversion into and out of PCM format is known as transcoding and takes place even in the case of a mobile-to-mobile call where, technically, it might be considered unnecessary. In the case of a mobile-to-mobile call, the transcoding being lossy serves only to reduce the speech quality.

In the (third generation) UMTS system, a mobile-to-mobile call can be made without transcoding. This is called transcoder free operation (TrFO).

In more detail, referring to FIG. 1, a mobile-to-mobile call is first connected by an uplink air interface 20 from a mobile station 10$u$ to a base station 30$u$, where the call bit stream is decoded by the base station 30$u$ and routed through a radio network controller (RNC) 40$u$ to the core network 50. The core network 50 is provided with transcoders, but if the call is being routed to another mobile station, the transcoders are bypassed and the call bit stream is dispatched directly to the downlink. In the downlink, a RNC 40$d$ routes the call bit stream to a base station 30$d$, which encodes the bit stream, and transmits it over a downlink air interface 60 to a mobile station 10$d$.

As is well known, error check codes known as cyclic redundancy codes (CRC) are used to determine at the layer one level whether there have been errors in the uplink or the downlink transmissions.

The present invention is concerned with the problem of detecting an error in a data frame in mobile-to-mobile communication where the error occurred in the uplink transmission, and the erroneous data frame is transmitted without further error over the downlink and, as is the current situation with the UMTS specification, no provision is made for directly signaling the uplink error directly over the downlink. In such a case, the layer one, conventional downlink error checking of the receiving mobile station necessarily fails to identify the error—as the downlink transmission from a layer one perspective was error free.

According to a first aspect, the present invention may provide a method of identifying errors in a data frame transmitted via a cellular network from a first mobile station to a second mobile station, comprising
the first mobile station performing the steps of:—
  generating an uplink error check code for a data frame for uplink transmission;
  transmitting the data frame and its associated uplink error check code to the network;
the network performing the steps of:—
  determining the quality of the received data frame;
  generating a downlink error check code for the received data frame, if the received frame quality is good, on the basis of the received data frame, and if the received frame quality is bad, on the basis of a function of the received data and a parameter indicative of the quality of the received frame quality;
  transmitting the data frame and the associated downlink error check code to the second mobile station;
the second mobile station performing the steps of:—
  decoding the received data frame and the associated downlink error check code;
  determining if the received data frame and the associated downlink error check code represent a good quality frame.

In accordance with this first aspect of the invention, it is possible to determine whether there was an error in the uplink without transmitting information directly to that effect over the downlink. If there is no error in the uplink, then a data frame and an associated downlink error check code, uncorrupted by said parameter, are transmitted over the downlink. However, if there is an error in the uplink, then a data frame and an associated downlink error check code, corrupted by said parameter, are transmitted over the downlink. The corruption caused by the parameter to the downlink error check code necessarily results in the received data frame being interpreted as a bad quality frame by the second mobile station. In the case of an error in the downlink transmission, the downlink error check code necessarily results in the received data frame being interpreted as a bad quality frame, regardless of whether there had already been an error in the uplink transmission.

Thus, from the perspective of the second mobile station, an uplink error and a downlink error are indistinguishable, and this downlink error condition only exists where there has been an actual transmission error on the uplink or the downlink.

In one embodiment using CRCs, the network generates a frame quality bit q indicative of whether the uplink data frame is of good quality, when q equals zero, and of bad quality when q equals 1. The downlink error check code is calculated on the basis of the frame quality bit appended to the leading end of the data frame, whereby when q equals 0, in effect, the downlink error check code is calculated on the basis of the received data frame only, the leading 0 being meaningless with CRCs.

According to a second aspect of the invention, the present invention may provide a method of identifying errors in a data frame transmitted via a cellular network from a first mobile station to a second mobile station, comprising
the first mobile station performing the steps of:—
  generating an uplink error check code for a data frame for uplink transmission;
  transmitting the data frame and its associated uplink error check code to the network;
the network performing the steps of:—
  determining the quality of the received data frame;
  generating a downlink error check code for the received data frame, if the received frame quality is good, on the basis of a first function of the received data frame and a first parameter indicative of the received frame quality, and if the received frame quality is bad, on the basis of a second function of the received data and a second parameter indicative of the quality of the received frame quality;
  transmitting the data frame and the associated downlink error check code to the second mobile station;
the second mobile station performing the steps of:—
  decoding the received data frame and the associated downlink error check code;
  determining if (i) the received data frame, having the inverse of the first function applied thereto, and the associated downlink check code, or (ii) the received data frame, having the inverse of the second function applied thereto, and the associated downlink check code, represent a good quality frame.

Thus, it is possible to determine whether there was an error in the uplink without transmitting information directly to that effect over the downlink. If there is no error in the uplink, but not the downlink, the second mobile stations detects this situation by the step (i) processing step resulting in an indication that a good quality frame was received. If there is an error in the uplink, but again not in the downlink, the second mobile station detects this by the step (ii) processing step resulting in an indication that a good quality frame was received. In the case where there is a downlink error, both step (i) and step (ii) processing steps fail to indicate that a good quality frame was received.

Thus, from the perspective of the second mobile station, an uplink error and a downlink error are distinguishable, and a downlink error condition always exists even when there has been no actual transmission errors over the uplink or the downlink.

In one embodiment, the network generates a frame quality bit q indicative of whether the uplink data frame is of good quality, when q equals zero, and of bad quality when q equals 1. The downlink error check code is calculated on the basis of the frame quality bit q appended to the trailing end of the data frame.

According to a third aspect, the present invention may provide a method of identifying errors in a data frame transmitted via a cellular network from a first mobile station to a second mobile station, comprising the first mobile station performing the steps of:—
  generating an uplink error check code for a data frame for uplink transmission;
  transmitting the data frame and its associated uplink error check code to the network;
the network performing the steps of:—
  determining the quality of the received data frame;
  generating a downlink error check code for the received data frame and, if the received data frame quality is good, modifying the error check code in accordance with a first operation, and if the received data frame quality is bad, modifying the error check code in accordance with a second operation;
  transmitting the data frame and its associated modified error check code to the second mobile station;
the second mobile station performing the steps of:—
  decoding the received data frame and the associated downlink error check code;
  determining if (i) the received data frame and the associated downlink check code, having the first operation applied in reverse thereto, or (ii) the received data frame and the associated downlink check code, having the second operation applied in reverse thereto, represent a good quality frame.

Thus, it is possible to determine whether there was an error in the uplink without transmitting information directly to that effect over the downlink. If there is no error in the uplink, but not the downlink, the second mobile stations detects this situation by the step (i) processing step resulting in an indication that a good quality frame was received. If there is an error in the uplink, but again not in the downlink, the second mobile station detects this by the step (ii) processing step resulting in an indication that a good quality frame was received. In the case where there is a downlink error, both step (i) and step (ii) processing steps fail to indicate that a good quality frame was received.

Thus, from the perspective of the second mobile station, an uplink error and a downlink error are distinguishable, and a downlink error condition always exits even when there has been no actual transmission errors over the uplink or the downlink.

Said operations can be any reversible operation which can be applied to the error check code bits. Reversibility is required in order for the second mobile station to be able to perform the necessary decoding. For example, the first operation might be inverting the bits of the error check code, and the second operation may be shifting the bits to the left or right, one or more times, but in a wrap-round fashion—such that the shifting operation is reversible.

According to a further aspect, the present invention may provide a method of identifying errors in over-the-air transmission of a data frame having associated frame quality information, wherein a first station performs the steps of:—
  generating a transmission error check code based on the data frame to be transmitted in combination with its associated frame quality information;
  transmitting the data frame, absent the frame quality information, and the transmission error check code;
a second station performs the steps of:—
  decoding the transmitted data frame and the transmission error check code;
  generating a pseudo error check code based on the decoded data frame and frame quality information indicative of a good frame;
  comparing the decoded transmission error check code and the pseudo error check code.

Thus, it is possible to determine whether there was an error in the data frame caused by a previous transmission of the frame, the error history being captured in the frame quality information, or whether an error was introduced during transmission over the downlink without transmitting information directly to that effect over the downlink. If there is an error in the downlink, the layer one error check code reveals this error. If the frame quality information indicates an error caused by a previous transmission, this is detected by the second mobile station by the mismatch between the error check code it receives over the downlink and that which it generates locally using reference frame quality information.

According to a still further aspect, the present invention may provide network infrastructure comprising:
  means for receiving a data frame and associated frame quality information;
  means for generating an error check code for the data frame based on the data frame in combination with the associated frame quality information; and
  means for transmitting the data frame, absent the frame quality information, and the error check code to a mobile station.

According to a still further aspect, the present invention provides a mobile station comprising:
  means for decoding a received data frame and associated error check code;
  means for generating a pseudo check code based on the received data frame and reference information indicative of quality frame; and
  means for comparing the decoded error check code and said pseudo check code to identify errors in the received data frame.

In this context, the term 'error check code' includes not only CRC coding but also other coding schemes which allow the detection of transmission errors.

An exemplary embodiment of the invention is hereinafter described with reference to the accompanying drawings, in which.

Figure 1:
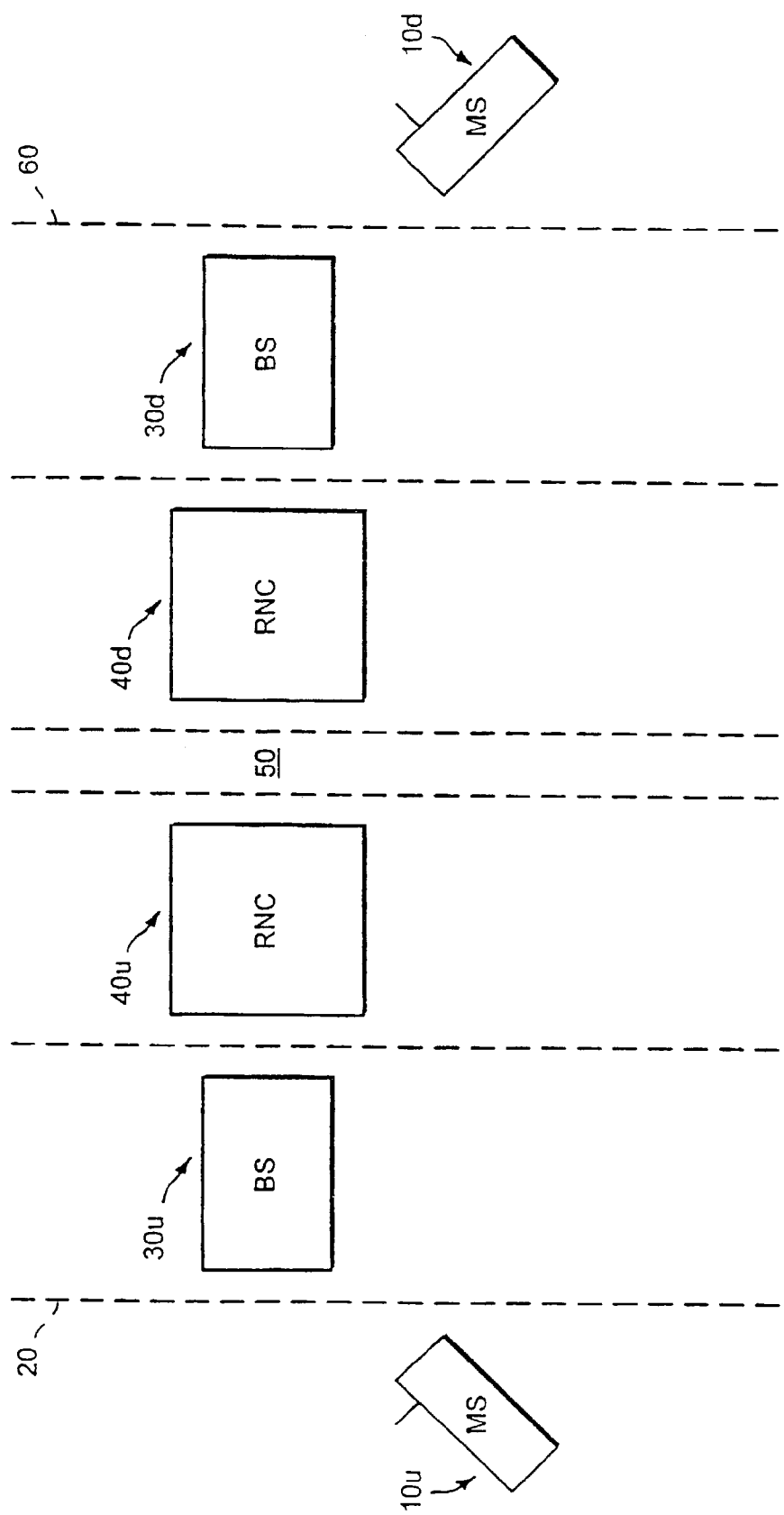
FIG. 1 shows a block diagram of a UMTS network illustrating a mobile-to-mobile call.
Figure 2:
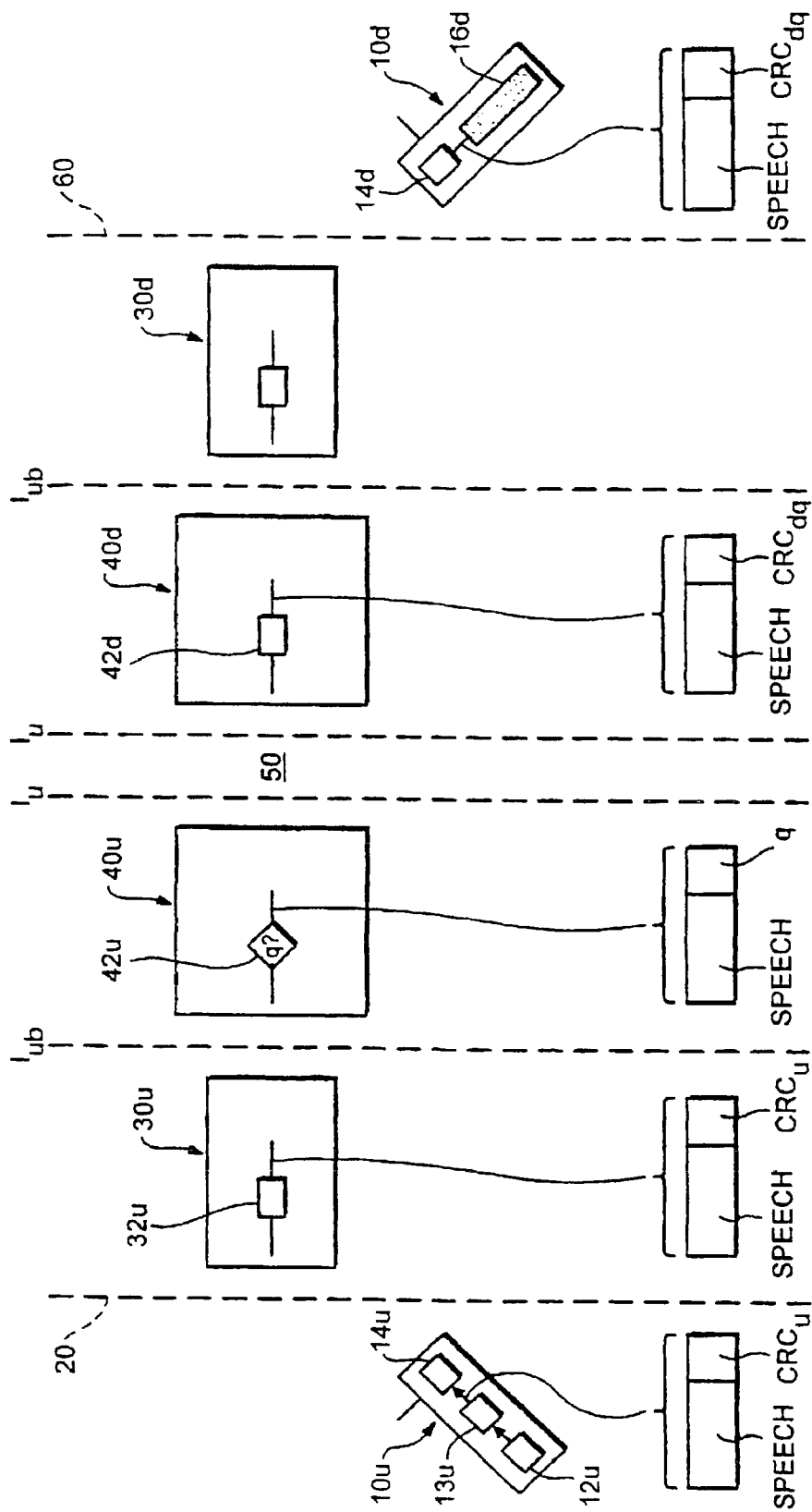
FIG. 2 shows a block diagram of a UMTS network illustrating an embodiment of the present invention sending a data frame from one mobile station to another mobile station.
Figure 4A:
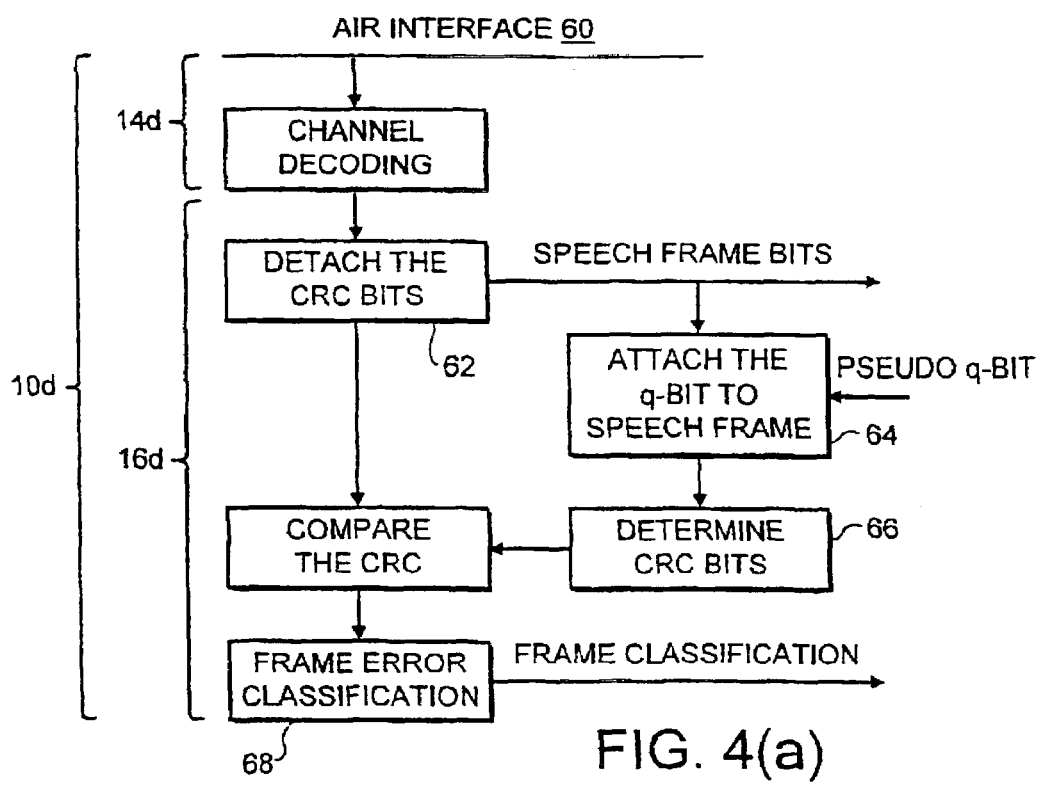
Figure 4B:
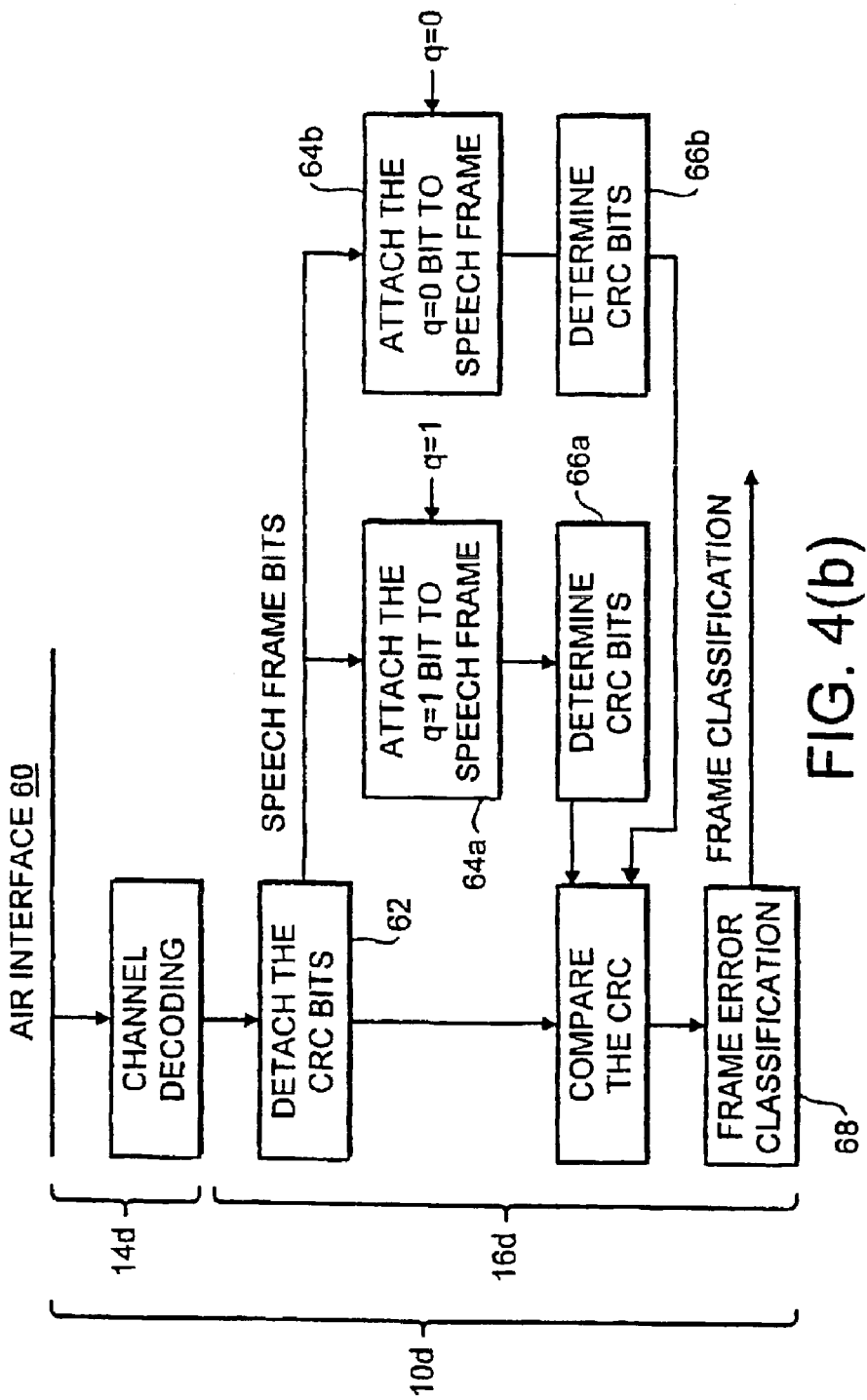
Figure 5:
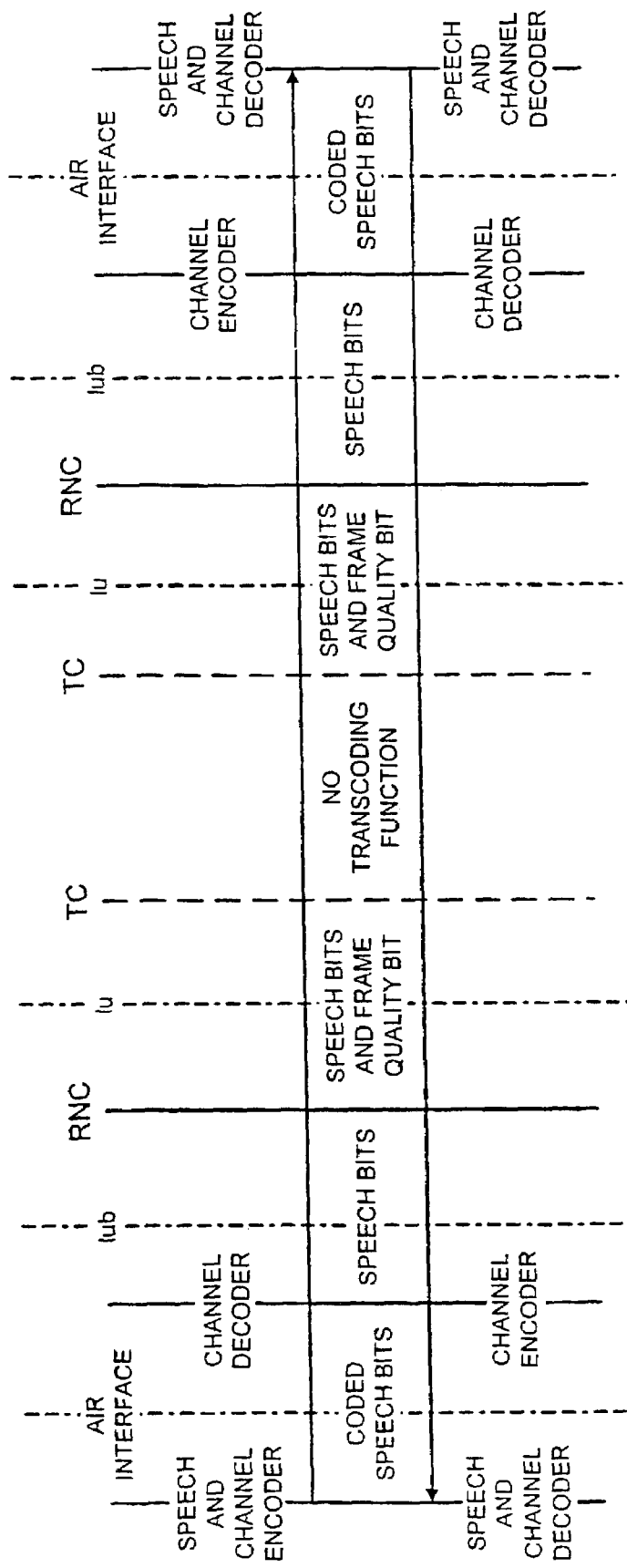

FIGS. 4(a) and 4(b) illustrate the operation of the receiving mobile station in FIG. 2; and FIG. 5 illustrates data frames bidirectionally over a UTMS network in accordance with the present invention.

FIG. 2 illustrates the transmission of a frame of speech data from one mobile station 10u to another mobile station 10d according to a first embodiment of the invention.

The mobile station 10u includes a speech encoder 12u for encoding the user's speech to produce a speech frame, a CRC encoder 13u for generating an error check code, CRCu, for the user's speech frame, and a channel encoder 14u for channel encoding the speech frame and CRCu. The channel encoder performs interleaving and convolution coding.

The resulting channel-encoded bit stream is transmitted over an uplink air interface 20 to a base station 30u. The base station 30u includes a channel decoder 32u for channel decoding the incoming bit stream into its constituent parts the speech frame and CRCu, which are delivered over interface Iub to a radio network controller (RNC) 40u.

The RNC 40u includes a CRC check unit 42u for determining whether the channel-decoded bit stream contains errors. According to whether the channel-decoded bit stream contains errors or not, a quality bit q is set to '1' or '0', respectively. The speech frame and the quality bit q are then delivered over interface Iu, for example according to the adaptive multirate (AMR) speech codec frame structure specification (TS26.101), to a core network 50 from where they are routed directly without transcoding to a RNC 40d over interface Iu.

The RNC 40d includes a CRC encoder 42d for generating an error check code for the speech frame with the quality bit q appended to the trailing end of the speech frame. This check code is labelled CRCdq. The speech frame and CRCdq is delivered to the base station 30d over interface Iub.

The base station 30d includes a channel encoder 32d for channel encoding the speech frame and CRCdq. he channel encoder 32d performs interleaving and convolution coding. The base station 30d transmits the channel-encoded speech frame and associated error check code CRCdq over the downlink air interface 60 to a mobile station 10d.

Figure 3:
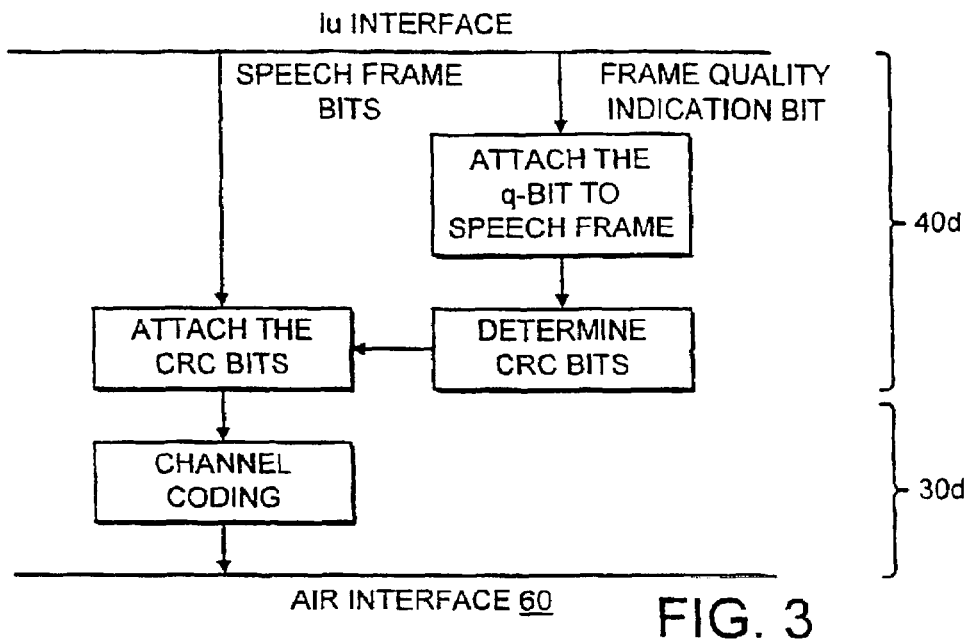
FIG. 3 illustrates the operation of the downlink infrastructure in FIG. 2.

The operation of the downlink infrastructure, the RNC 40d and the base station 30d, is illustrated in FIG. 3.

The mobile station 10d includes a channel decoder 14d for decoding the incoming bit stream into its constituent parts the speech frame and CRCdq. The mobile station 10d also includes an incoming frame classification unit 16d, the operation of which is illustrated with reference to FIG. 4(a). First, the unit 16d strips the error check code CRCdq from the channel-decoded bit stream (box 62). Next, the received speech frame has attached thereto a reference quality bit q=0 (box 64). Next, on the basis of the speech frame and the quality bit q=0, an error check code is generated CRCq=0 as if the speech frame were intended for transmission over the air (box 66). After that, the error check code CRCq=0 is compared with CRCdq. Based on the result of this comparison, the received frame can be classified as either good/error free or bad/erroneous (box 68). In more detail, if the error check codes are identical, then this signifies that the received frame is error free. On the other hand, if the error check codes differ, then this signifies that the received frame is erroneous.

Referring to FIG. 2, in the case where a speech frame is successfully transmitted over the uplink interface 20, then in the RNC 40u, the quality bit is set to 0. The speech frame and the quality bit is routed over the core network 50 and is not transcoded. On reaching the downlink RNC 40d, as per FIG. 3, the downlink error check code CRCdq is generated on the basis of the speech frame and the quality bit, the quality being equal to 0. The speech frame and CRCdq is transmitted over the downlink 60.

It will be appreciated that because the speech frame is being transmitted with CRC bits calculated on the basis of the speech frame and the quality bit, then an error condition is being forced on the downlink. In other words, because the transmitted CRC bits are not calculated on the basis of the transmitted speech frame alone, when the speech frame and CRC bit speech stream is received, and divided by the CRC polynomial—a remainder, which signifies an error, will always result.

After the speech frame and CRCdq is received by the mobile station 10d, a reference error check code is generated on the basis of the received speech frame and a quality bit set equal to 0. This reference error check code is labelled CRCq=0. Because, from the foregoing, it is known that in the RNC 40d a similar calculation took place with q=0, then CRCdq will equal CRCq=0—in cases where there is no error in the downlink transmission.

On the other hand, in the case where a speech frame is unsuccessfully transmitted over the uplink interface 20, then in the RNC 40u, the quality bit is set to 1. The speech frame and the quality bit is routed over the core network 50 and is not transcoded. On reaching the downlink RNC 40d, as per FIG. 3, the downlink error check code CRCdq is generated on the basis of the speech frame and the quality bit, the quality bit being 1. The speech frame and CRCdq is transmitted over the downlink 60.

For the same reason as before, it will be appreciated that because the speech frame is being transmitted with CRC bits calculated on the basis of the speech frame and the quality bit, then an error condition is being forced on the downlink.

After the speech frame and CRCdq is received by the mobile station 10d, a reference error check code is generated on the basis of the received speech frame and a quality bit set equal to 0. This reference error check code is labelled CRCq=0. Because, from the foregoing, it is known that in the RNC 40d a similar calculation took place with q=1, then CRCdq will not equal CRCq=0. Of course, if there is an error in the downlink transmission, then again CRCdq will not equal CRCq=0.

Thus, by using this embodiment of the invention, it is possible to determine whether there was an error in the uplink/downlink transmissions without transmitting information directly to that effect over the downlink 60. In this first embodiment of the invention, it is not determined by the receiving mobile station 10d whether the error causing the failure originated from the uplink or the downlink.

In a second embodiment of the invention, the operation of the mobile station 10d is slightly more complex, but allows errors in the uplink and the downlink to be differentiated. Referring to FIG. 4(b), first of all, the unit 16d strips the error check code CRCdq from the channel-decoded bit stream (box 62). Next, the received speech frame has attached thereto a reference quality bit q=1 (box 64a) and a reference quality bit q=0 (box 64b). Next, on the basis of the speech frame and the quality bit q=1, an error check code is generated CRCq=1 as if the speech frame were intended for transmission over the air (box 66a). Also, on the basis of the speech frame and the quality bit q=0, an error check code is generated CRCq=0 as if the speech frame were intended for transmission over the air (box 66b). After that, the error check code CRCq=0 and the error check code CRCq=1 are compared with CRCdq. Based on the result of this comparison, the received frame can be classified (box 68) as either uplink good/error free, if CRCdq equals CRCq=0, or uplink bad/erroneous, if CRCdq equals CRCq=1. If CRCdq does not equal either CRCq=0 or CRCq=1, then an error can be assumed in the downlink.

Referring to FIG. 2, in a third embodiment, the RNC 40d includes a CRC encoder 42d for generating an error check code for the speech frame with the quality bit q appended to the leading end of the speech frame, but is otherwise identical in operation to the first embodiment from the mobile station 10u to the downlink air interface 60. This approach has the advantage that in the case where there is no uplink error, and thus the quality bit q equals 0, this bit has no effect on the calculation of the downlink CRC bits, CRCdq, that is, as conventional, CRCdq is a function of the speech frame data only. As a result, the mobile station 10d need only perform a standard CRC polynomial division operation on the received data in order to determine whether there has been a error or not. In the case where there is an error, the mobile station 10d is unable to distinguish between an error in the uplink, which manifests itself as a forced error in the downlink, and an error emanating from the downlink transmission itself.

FIG. 5 illustrates the sending of speech frames bidirectionally between mobile stations 10u and 10d. In this Figure, similar labels represent similar apparatus.

The CRC check unit 42u and CRC encoder 42d can alternatively be implemented in the base stations 30u and 30d, respectively.

Although described in relation to TrFO, the invention can be applied in other scenarios. One such scenario is the advanced tandem free operation (TFO). In this kind of operation, a radio access network transmits data to a core network in a format where, within a given word, the least significant bits contain data relating to the speech codec parameters of the user's speech and the most significant bits contain the user's speech encoded in PCM format. Thus, if a network connected to the core network does not support TFO, then the PCM encoded bits can be used. It will be appreciated that the least significant bits will behave as noise on the PCM signal. Whereas, if the network does support TFO, then the codec parameters can be used directly.

The invention claimed is:

1. A method of identifying errors in a data frame transmitted via a cellular network from a first mobile station to a second mobile station different from the first mobile station, comprising
the first mobile station performing the steps of:
generating an uplink error check code for a data frame for uplink transmission; and
transmitting the data frame and its associated uplink error check code to the network;
the network performing the steps of:
determining the quality of the received data frame;
generating a downlink error check code for the received data frame, if the received frame quality is good, on the basis of the received data frame, and if the received frame quality is bad, on the basis of a function of the received data and a parameter indicative of the quality of the received data frame; and
transmitting the data frame and the associated downlink error check code to the second mobile station;
the second mobile station performing the steps of:
decoding the received data frame and the associated downlink error check code; and
determining if the received data frame and the associated downlink error check code represent a good quality data frame.

2. A method of identifying errors in a data frame transmitted via a cellular network from a first mobile station to a second mobile station different from the first mobile station, comprising
the first mobile station performing the steps of:
generating an uplink error check code for a data frame for uplink transmission; and
transmitting the data frame and its associated uplink error check code to the network;
the network performing the steps of:
determining the quality of the received data frame;
generating a downlink error check code for the received data frame, if the received frame quality is good, on the basis of a first function of the received data frame and a first parameter indicative of the received frame quality, and if the received frame quality is bad, on the basis of a second function of the received data and a second parameter indicative of the quality of the received data frame quality; and
transmitting the data frame and the associated downlink error check code to the second mobile station;
the second mobile station performing the steps of:
decoding the received data frame and the associated downlink error check code; and
determining if (i) the received data frame, having the inverse of the first function applied thereto, and the associated downlink check code, or (ii) the received data frame, having the inverse of the second function applied thereto, and the associated downlink check code, represent a good quality data frame.

3. A method of identifying errors in a data frame transmitted via a cellular network from a first mobile station to a second mobile station different from the first mobile station, comprising
the first mobile station performing the steps of:—
generating an uplink error check code for a data frame for uplink transmission; and
transmitting the data frame and its associated uplink error check code to the network;
the network performing the steps of:
determining the quality of the received data frame;
generating a downlink error check code for the received data frame and, if the received data frame quality is good, modifying the error check code in accordance with a first operation, and if the received data frame quality is bad, modifying the error check code in accordance with a second operation; and
transmitting the data frame and its associated modified error check code to the second mobile station;
the second mobile station performing the steps of:
decoding the received data frame and the associated downlink error check code; and determining if (i) the received data frame and the associated downlink check code, having the first operation applied in reverse thereto, or (ii) the received data frame and the associated downlink check code, having the second operation applied in reverse thereto, represent a good quality data frame.

4. A method of identifying errors in an over-the-air transmission of a data frame having associated frame quality information, wherein a first station performs the steps of:

generating a transmission error check code based on the data frame to be transmitted in combination with its associated frame quality information;

transmitting the data frame, absent the frame quality information, and the transmission error check code;

and a second station different than the first station performs the steps of:

decoding the transmitted data frame and the transmission error check code;

generating a pseudo error check code based on the decoded data frame and frame quality information indicative of a good data frame; and comparing the decoded transmission error check code and the pseudo error check code.

* * * * *